(12) United States Patent
Ansari et al.

(10) Patent No.: US 6,609,816 B2
(45) Date of Patent: Aug. 26, 2003

(54) HIGH EFFICIENCY ILLUMINATOR

(75) Inventors: Ajmal I. Ansari, Canton, MI (US);
Jeffrey A. Erion, Plymouth, MI (US);
Leonard S. Livschitz, West Bloomfield, MI (US); William Ince, Novi, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/949,190

(22) Filed: Sep. 7, 2001

(65) Prior Publication Data

US 2003/0048638 A1 Mar. 13, 2003

(51) Int. Cl.⁷ ................................................. F21V 9/00
(52) U.S. Cl. ........................ 362/294; 362/580; 362/226; 362/345; 362/265
(58) Field of Search .............................. 362/226, 294, 362/345, 373, 264, 580, 547, 261, 265, 538; 359/395

(56) References Cited

U.S. PATENT DOCUMENTS

| 3,639,751 A | * | 2/1972 | Pichel | 362/261 |
| 4,025,779 A | * | 5/1977 | Ahroni | 362/294 |
| 4,233,493 A | * | 11/1980 | Nath | 362/294 |
| 4,633,128 A | | 12/1986 | Roberts et al. | 313/113 |
| 4,682,276 A | * | 7/1987 | Miller | 362/294 |
| 4,841,422 A | | 6/1989 | Groh | 362/294 |
| 4,985,815 A | | 1/1991 | Endo | 362/294 |
| 5,099,399 A | * | 3/1992 | Miller et al. | 362/294 |
| 5,228,770 A | * | 7/1993 | Brunson | 362/261 |
| 5,343,368 A | * | 8/1994 | Miller | 362/294 |
| 5,420,769 A | | 5/1995 | Ahlgren et al. | 362/294 |
| 5,467,416 A | | 11/1995 | Weingartner | 385/31 |
| 5,860,723 A | | 1/1999 | Domas et al. | 362/294 |
| 5,873,650 A | | 2/1999 | Luk et al. | 362/294 |
| 5,924,792 A | | 7/1999 | Cassarly et al. | 362/554 |

FOREIGN PATENT DOCUMENTS

| GB | 2 261 279 A | 5/1993 |
| JP | 10-188634 A | 7/1998 |

OTHER PUBLICATIONS

Derwent English Abstract of Japanese Patent No. 10–188634.

* cited by examiner

Primary Examiner—Stephen Husar
Assistant Examiner—Bao Truong
(74) Attorney, Agent, or Firm—Brinks Hofer Gilson & Lione

(57) ABSTRACT

An illumination system for delivering light includes a light source, a reflector including a reflective surface adapted to reflect visible light from the light source and to allow heat energy to pass through the reflector, and a housing. The housing includes a base defining a first cavity and a heat dissipation portion extending from said base and defining a second cavity with an opening extending therebetween. The housing is adapted to support the light source and provides a thermal barrier between the housing and the light source. The heat dissipation portion is adapted to transfer heat energy from the reflector to a surrounding environment. A ballast is mounted to the housing to supply power to the light source and a cap is mounted to the heat dissipation portion and is adapted to interconnect the heat dissipation portion to an optical light distribution system.

15 Claims, 5 Drawing Sheets

HIGH EFFICIENCY ILLUMINATOR

TECHNICAL FIELD OF THE INVENTION

The present invention generally relates to a compact illuminator for supplying light to a fiber optic or other optical light distribution system.

BACKGROUND

Compact, high output light sources that are adapted to provide light to a fiber optic or other optical light distribution system typically generate high amounts of heat. Traditional systems have utilized active cooling devices, such as a forced air fan, or large container dimensions to control the amount of heat that is transferred from the light source to other components of the system. Therefore, there is a need in the industry for an improved, compact, high output illuminator system.

SUMMARY OF THE INVENTION

An illumination system for delivering light includes a light source, a reflector including a reflective surface adapted to reflect visible light from the light source and allow heat energy to pass through the reflector, a housing, and a cap. The housing includes a base defining a first cavity and a heat dissipation portion extending from said base and defining a second cavity with an opening extending therebetween. The housing is adapted to support the light source and provides a thermal barrier between the base of the housing and the light source. The heat dissipation portion is adapted to transfer heat energy from the reflector to a surrounding environment. A ballast is mounted to the housing to supply power to the light source and a cap is mounted to the heat dissipation portion and is adapted to interconnect the heat dissipation portion to an optical light distribution system, to support the optical light distribution system relative to the light source.

DETAILED DESCRIPTION OF THE PREFERRED EMBODIMENT

The following description of the preferred embodiment of the invention is not intended to limit the scope of the invention to this preferred embodiment, but rather to enable any person skilled in the art to make and use the invention.

Referring to the Figures, an illumination system for delivering light is shown generally at 10. The illuminator includes a light source assembly 12 to produce the desired light and a housing 14 for supporting the light source 12.

Figure 1:
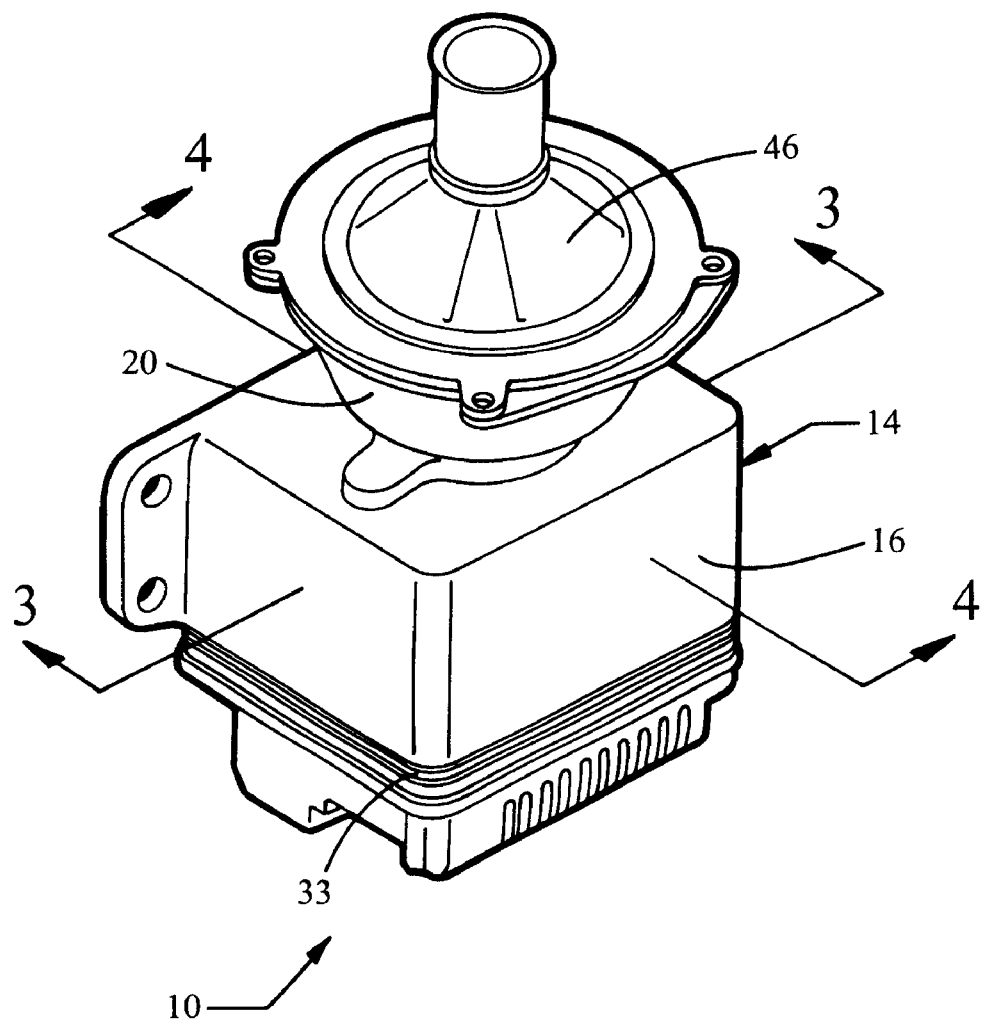
FIG. 1 is a perspective view of an illuminator of the preferred embodiment of the present invention.
Figure 2:
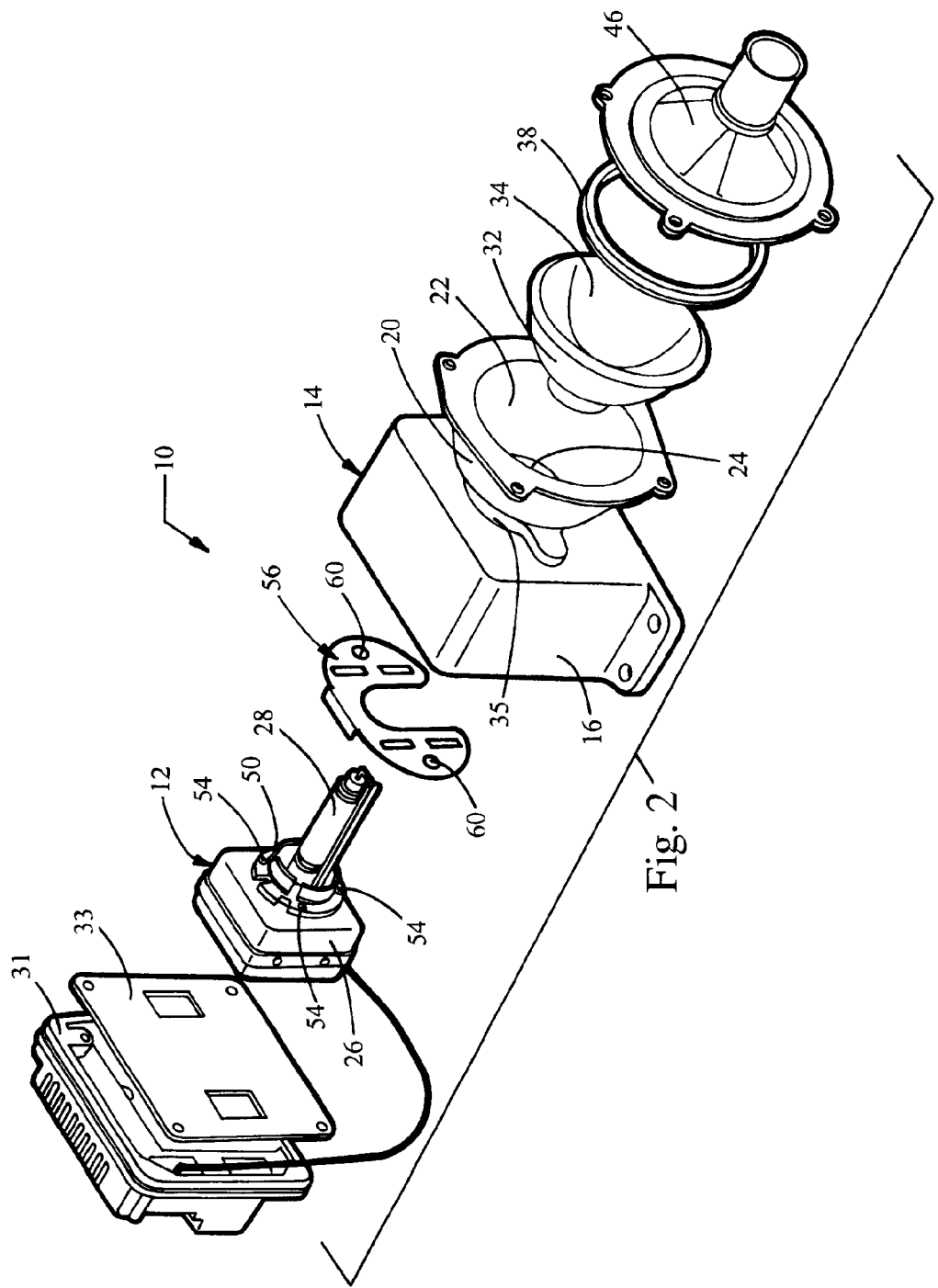
FIG. 2 is an exploded view of the illuminator of FIG. 1.
Figure 3:
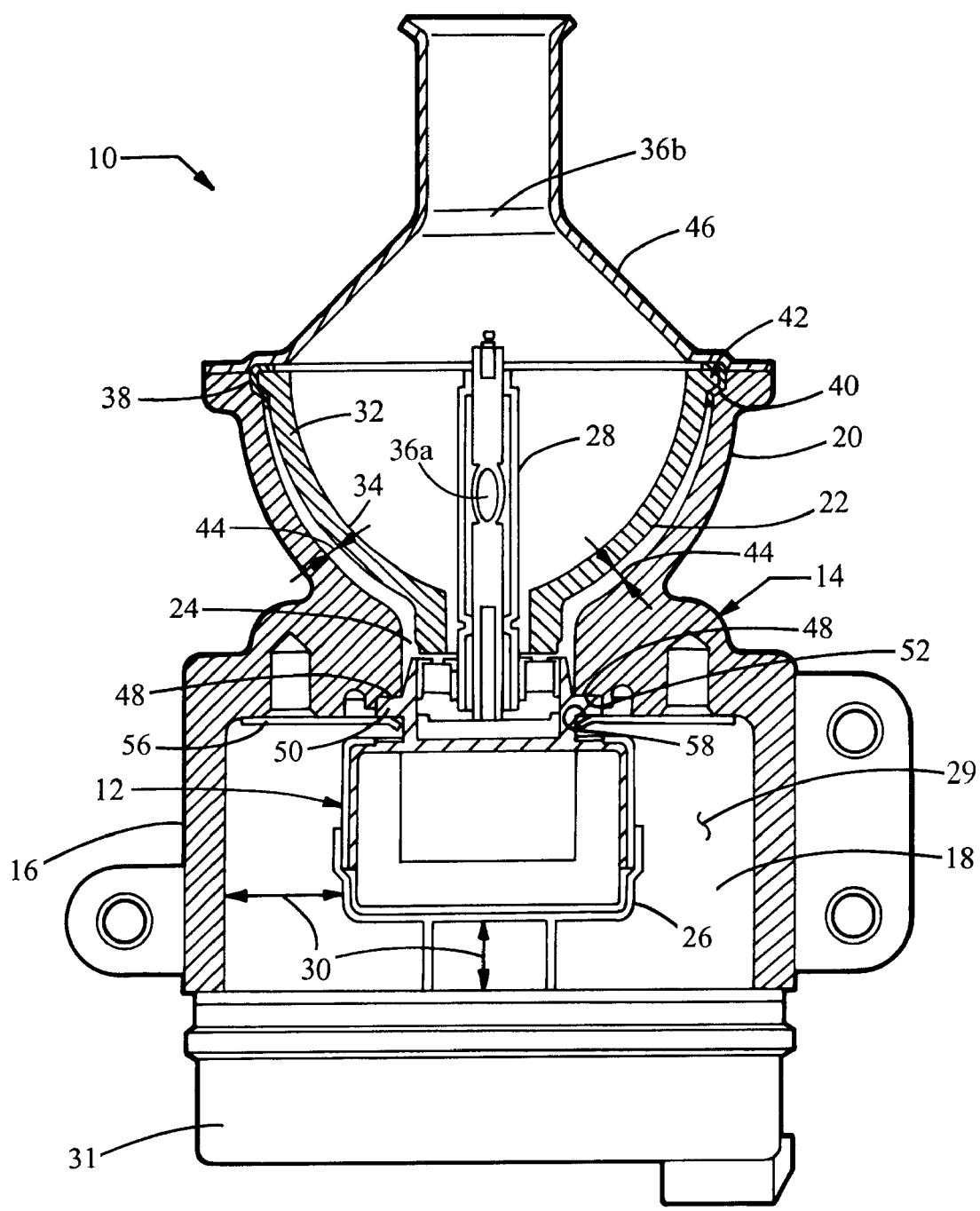
FIGS. 3 and 4 are a cross sectional views of the illuminator taken along lines 3—3 and 4—4 respectively of FIG. 1.
Figure 4:
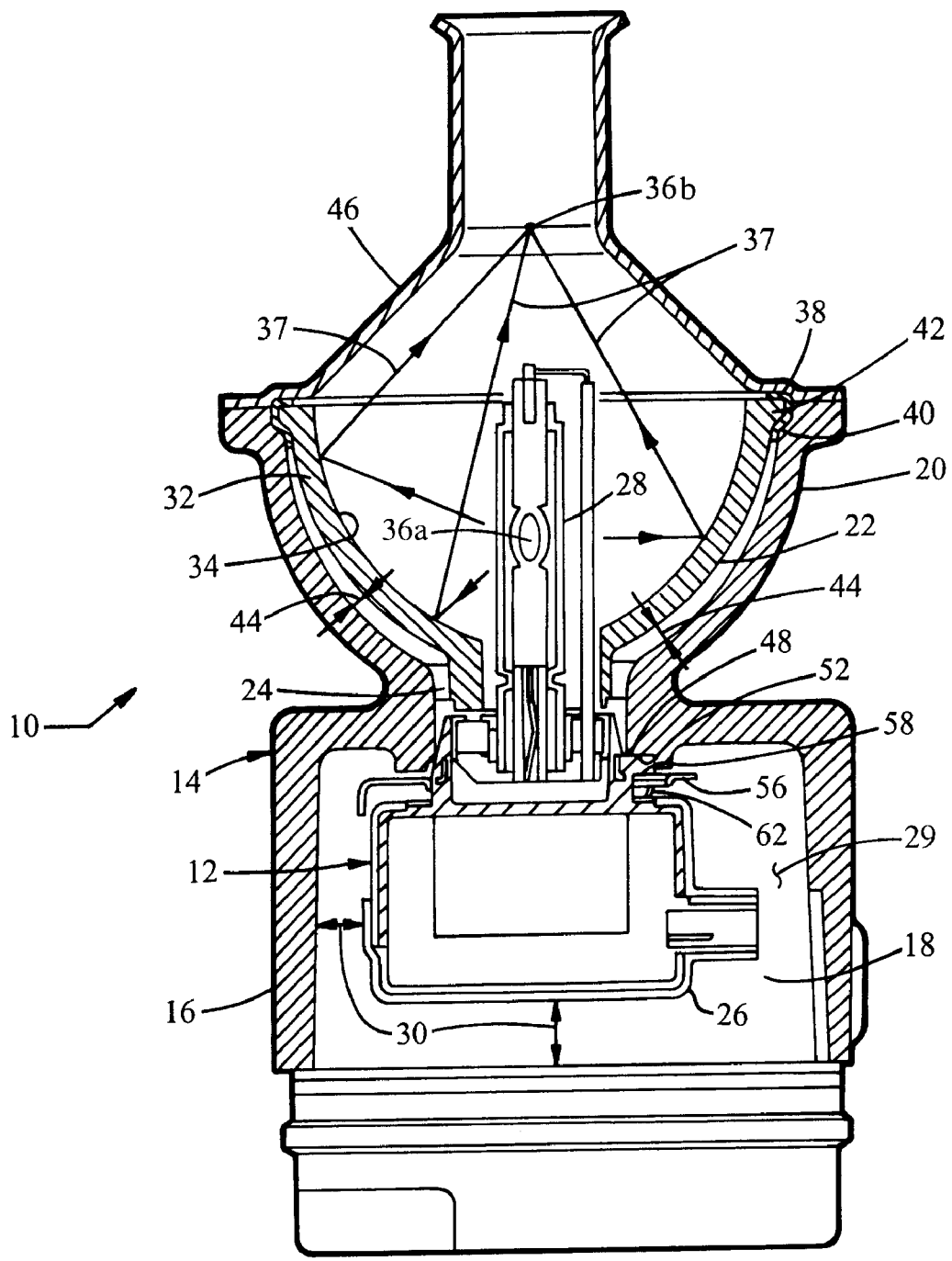

Referring to FIGS. 2–4, the housing 14 includes a base 16 which is hollow and defines a first cavity 18. The housing 14 also includes a heat dissipation portion 20 which extends from the base 16 and defines a second cavity 22. An opening 24 extends between the first cavity 18 and the second cavity 22. The housing is preferably made from aluminum and can be cast aluminum, die cast, or machined from aluminum. It is to be understood, however, that the housing could be made from any suitable material with the appropriate structural characteristics.

The light source 12 includes a light base 26. A light element 28 extends from the light base 26. Preferably, as shown in the figures, the light element 28 is a high intensity discharge (HID) arc light source, wherein an igniter and lamp control circuitry (not shown) for the HID light source are mounted within the light base 26, however it is to be understood that the light element 28 could be any type of light producing element such as a filament bulb or any other suitable light element.

Preferably, the light source 12 is supported by the housing 14 with the light base 26 disposed within the first cavity 18 and the light element 28 extending through the opening 24 and into the second cavity 22 within the heat dissipation portion 20. A thermal barrier 29 substantially surrounds the light base 26 to insulate the light base 26 from heat conducted by the housing 14 from the light element 28. thermal barrier 29 comprises an air gap 30 between the light base 26 and the interior surface of the first cavity 18. Alternatively, in some instances, it may be preferable to fill in the air gap 30 with a solid insulating material (not shown). The solid insulating material would substantially fill the air gap 30 surrounding the light base 26 to insulate the light base 26 and the ballast 31 from heat conducted by the housing 14 from the light element 28.

A ballast 31 is mounted at a distal end of the base 16 with fasteners and is adapted to supply power to the light source 12. Preferably, a gasket 33 is disposed between the housing 14 and the ballast 31. The gasket 33 is adapted to provide a seal between the housing 14 and the ballast 31 to maintain an air-tight seal for the first cavity 18. The gasket 33 further provides thermal insulation between the housing 14 and the ballast 31 to prevent heat from being conducted from the housing 14 and the first cavity 18 to the ballast 31.

A reflector 32 is supported within the second cavity 22 and includes a reflective surface 34 adapted to reflect the visible light from the light element 28. Preferably, the reflector 32 is elliptical in shape and is adapted to reflect light from a first focal point 36a to a second focal point 36b. Preferably, the light element 28 is placed at the first focal point 36a such that the light from the light element 28 is reflected to the second focal point 36b at a distance from the light element 28. Referring to FIG. 4, light rays 37 emitting from the light element 28 reflect from the reflector 32 and meet at the focal point 36b. The reflector 18 is also adapted to allow heat energy radiated by the light element 28 to pass through the reflector 32. The reflector 32 includes an opening aligned with the opening 24 within the housing 14 to allow the light element 28 to extend therein. The housing 14 includes a narrow neck portion 35 between the heat dissipation portion 20 and the base 16. This narrow neck portion 35 minimizes the cross-sectional area of the housing available to conduct heat from the heat dissipation portion 20 to the base 16.

The heat dissipation portion 20 is adapted to support the reflector 32 and to transfer heat energy that radiates through the reflector 32 to the surrounding environment. Although not shown in the figures, the heat dissipation portion 20 of the housing 14 can also include fins (not shown) extending therefrom. The fins provide more surface area to the heat dissipation portion 20, and thereby allow increased heat flow to the surrounding environment and decreased conduction of heat to the base portion 16 of the housing 14. Preferably, the reflector 32 is supported within the second cavity 22 by a seal 38. The second cavity 22 presents an outer lip 40 and the seal 38 is adapted to fit within said lip 40. The reflector 32 includes an annular ridge 42 that is adapted to rest within the seal 38, thereby supporting the reflector 32 within the second cavity 22 such that the reflector 32 is supported solely by the seal 38 leaving an air gap 44 between the reflector 32 and the heat dissipation portion 20 of the housing 14 so that no portion of the reflector 32 touches the housing 14. Preferably, the seal 38 is made from silicone, however it is to be understood that the seal 38 could be made from any suitable material that has appropriate mechanical properties such as thermal resistance, strength and stiffness.

Figure 5:
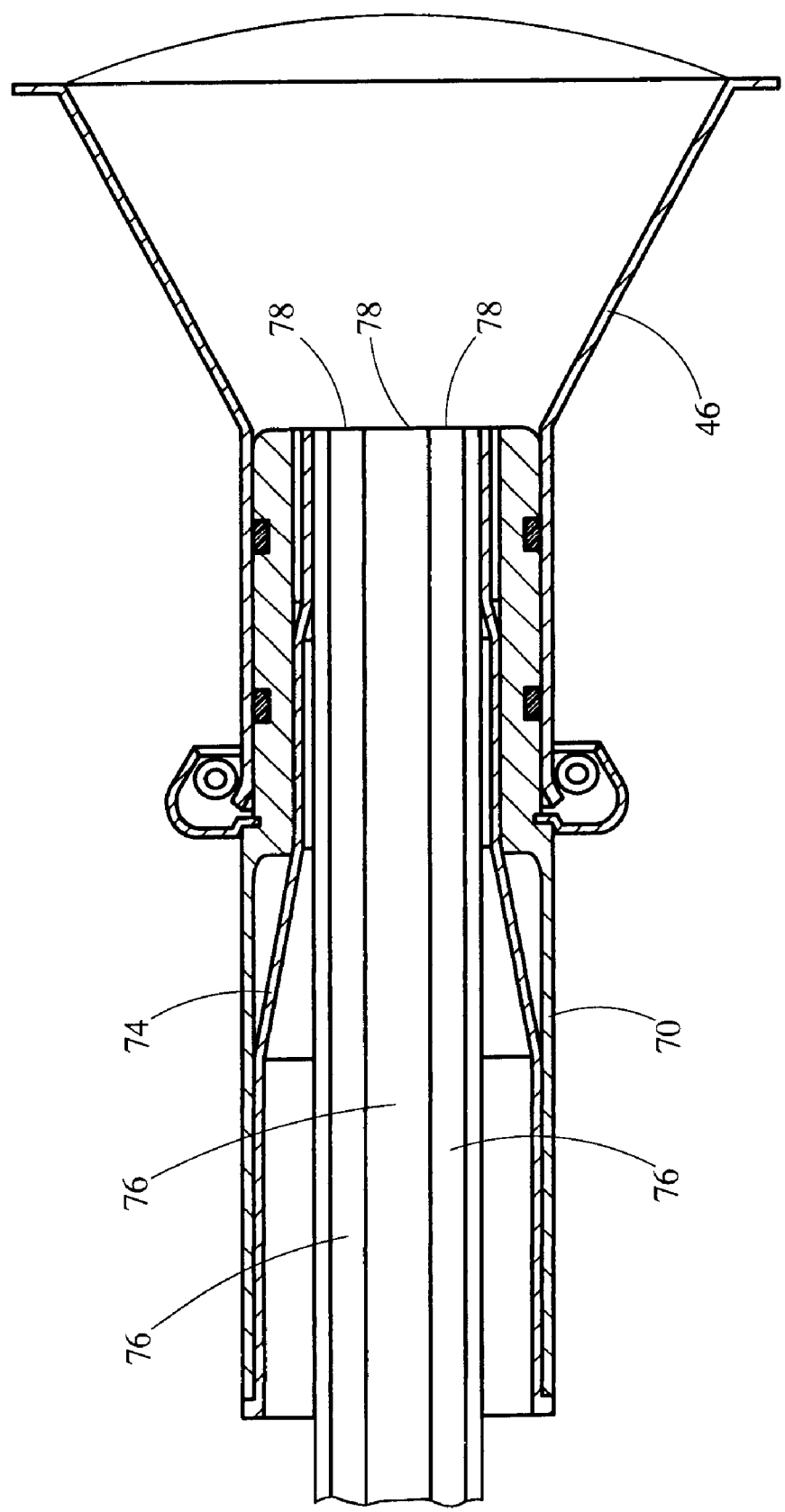
FIG. 5 is a cross sectional view illustrating how the cap connects to a light collector.

A cap 46 is mounted to a distal end of the heat dissipation portion 20 of the housing 14. The cap 46 is adapted to interconnect the heat dissipation portion 20 of the housing 14 to an optical light distribution system (not shown). Referring to FIG. 5, the cap 46 is adapted to support a light collector 70 and to position the light collector 70 at the second focal point 36b to deliver the light produced by the light element 28 to the light collector 70. In the preferred embodiment, the cap 46 is adapted to support a fiber optic connector 72 and to position a fiber optic cable 74 at the second focal point 36b to deliver the light produced by the light element 28 to the fiber optic cable 74. The fiber optic connector 72 is disclosed in U.S. Pat. No. 6,318,907 B1, which was filed on Sep. 29, 2000 and is assigned to Visteon and is hereby incorporated by reference into this application. The cap 46 is removably attached to the distal end of the heat dissipation portion 20 by threaded fasteners. Preferably, the fiber optic cable 74 is a bundle of optical fibers 76 with the ends 78 of the fibers 76 located at the second focal point 36b.

The housing 14 further includes a controlled surface 48 to support said light source 12. The controlled surface 48 is formed on said housing 14 at a specified distance from the distal end of said heat dissipation portion 20. The specified distance is such that when the light source 12 is placed within the housing 14 and rests against the controlled surface 48, the light element 28 is correctly located at the first focal point 36a of the reflector 32 so the light from the light element 28 will reflect from the reflector 32 to the second focal point 36b to be collected by the light collector. The controlled surface 48 can be an as-cast surface on the housing 14 or can be machined into the housing 14.

Preferably, the light base 26 includes an annular flange 50. A top surface 52 of the flange 50 includes three contact points 54 to provide a three point support for the light source 12 on the controlled surface 48.

The illuminator 10 further includes a retainer 56 adapted to engage a bottom surface 58 of the flange 50 to secure the light source 12 to the housing 14. The retainer 56 includes a plurality of apertures 60 adapted to receive threaded fasteners and the housing includes a corresponding plurality of threaded apertures adapted to receive the threaded fasteners to secure the retainer 56 within the housing 14, thereby securing the light source 12 against the controlled surface 48.

The retainer 56 further includes a plurality of spring fingers 62 extending therefrom to engage a portion of the light base 26 opposite the bottom surface 58 of the flange 50 to frictionally hold the retainer 56 onto the light source 12.

The foregoing discussion discloses and describes one preferred embodiment of the invention. One skilled in the art will readily recognize from such discussion, and from the accompanying drawings and claims, that changes and modifications can be made to the invention without departing from the true spirit and fair scope of the invention as defined in the following claims. The invention has been described in an illustrative manner, and it is to be understood that the terminology which has been used is intended to be in the nature of words of description rather than of limitation.

We claim:

1. An illumination system for delivering light comprising:
   a light source;
   a reflector including a reflective surface adapted to reflect visible light from said light source and to allow heat energy to pass through said reflector;
   a housing having a base defining a first cavity, a heat dissipation portion extending from said base and defining a second cavity and an opening extending between said first cavity and said second cavity, said housing adapted to support said light source and including a thermal barrier between said housing and said light source, said heat dissipation portion adapted to transfer heat energy from said reflector to a surrounding environment;
   a ballast mounted to said housing to supply power to said light source; and
   a cap adapted to interconnect said heat dissipation portion of said housing to an optical light distribution system.

2. The illumination system of claim 1 wherein said housing includes a controlled surface to support said light source and to locate said light source within said housing.

3. The illumination system of claim 2 wherein said light source includes a flange, said flange including at least three positional contact points to provide a stable support surface to rest upon said controlled surface of said housing.

4. The illumination system of claim 3 further including a retainer adapted to engage said flange of said light source and including a plurality of apertures adapted to receive fasteners to mount said retainer within said housing, thereby securing said light source against said controlled surface.

5. The illumination system of claim 4 wherein said retainer includes a plurality of spring fingers extending therefrom to engage a portion of said light source opposite said flange to frictionally hold said retainer onto said light source.

6. The illumination system of claim 1 wherein said light source includes a light base and a light element extending from said light base, said thermal barrier within said housing base comprising an air gap extending around said light base to insulate said light base from said housing.

7. The illumination system of claim 6 wherein said light element is an arc light source.

8. The illumination system of claim 6 wherein said thermal barrier further comprises a solid insulation material disposed within said air gap to substantially fill the air gap around said light base to insulate said light base and said ballast from said housing.

9. The illumination system of claim 1 wherein said reflector is supported within said heat dissipation portion of said housing by a seal and an air gap extends between said reflector and said heat dissipation portion such that said reflector is supported solely by said seal.

10. The illumination system of claim 9 wherein said seal is made from silicone.

11. The illumination system of claim 1 wherein said reflector is elliptical in shape and is adapted to reflect light from said light source to a focal point at a distance from said light source and said cap is mounted to said heat dissipation portion of said housing and is adapted to position a light collector at said focal point to deliver the light produced by said light source to the light collector.

12. The illumination system of claim 1 wherein said housing is made from aluminum.

13. The illumination system of claim 1 further including a gasket disposed between said housing and said ballast, said gasket adapted to provide an air tight seal for said first cavity and to provide thermal insulation between said housing and said ballast.

14. The illumination system of claim 1 wherein said opening extending between said first and second cavities is defined by a narrow neck portion of said housing interconnecting said heat dissipation portion and said base.

15. The illumination system of claim 11 wherein said light collector is a fiber optic connector having a plurality of fiber optic cables, said end cap being adapted to support said light collector such that distal ends of said fiber optic cables are positioned at said focal point.

* * * * *